July 5, 1927.  
P. M. SHARPLES  
1,634,759  
CENTRIFUGAL MILK SEPARATOR  
Filed July 30, 1924 2 Sheets-Sheet 1
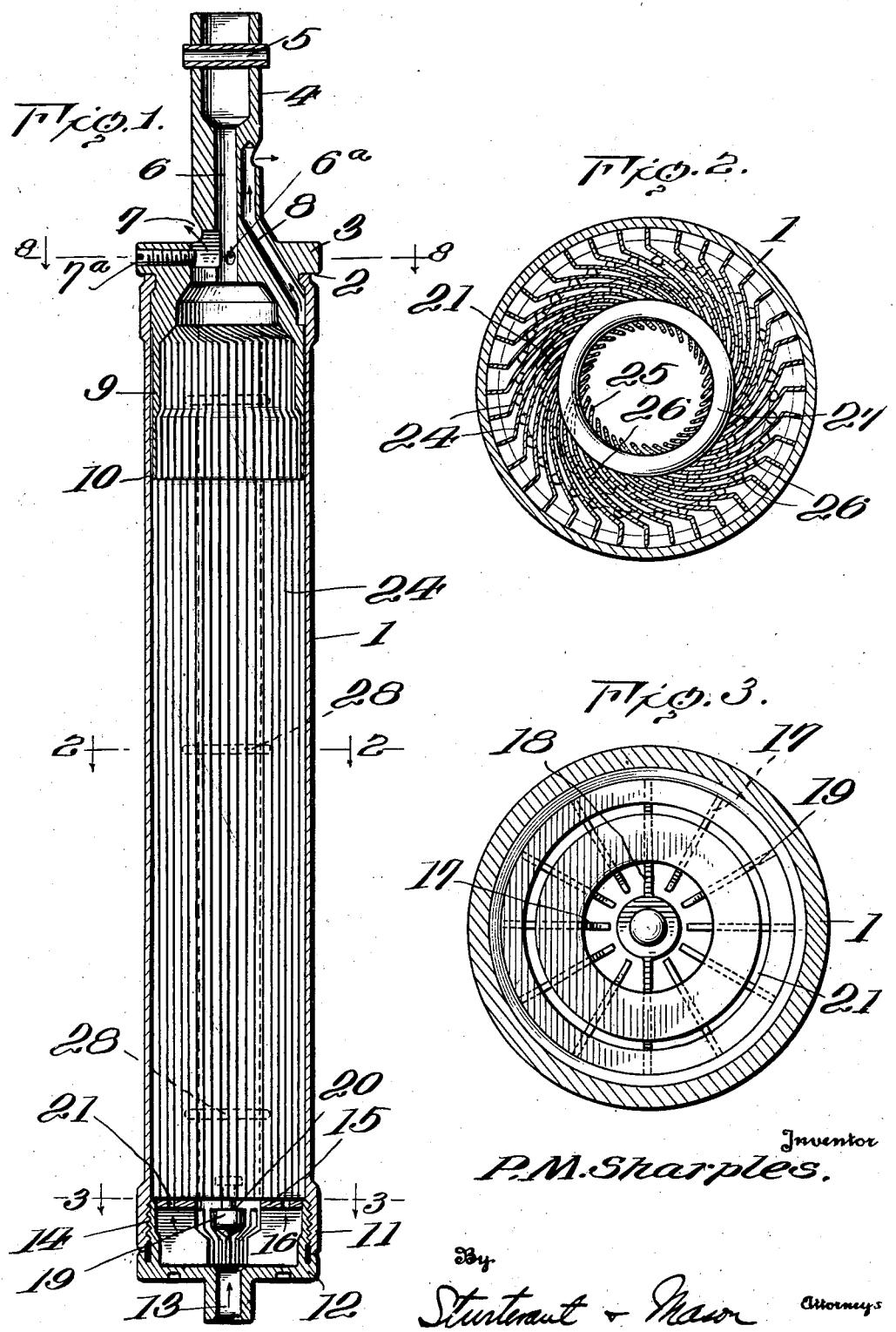

July 5, 1927.
P. M. SHARPLES
1,634,759
CENTRIFUGAL MILK SEPARATOR
Filed July 30, 1924   2 Sheets-Sheet 2
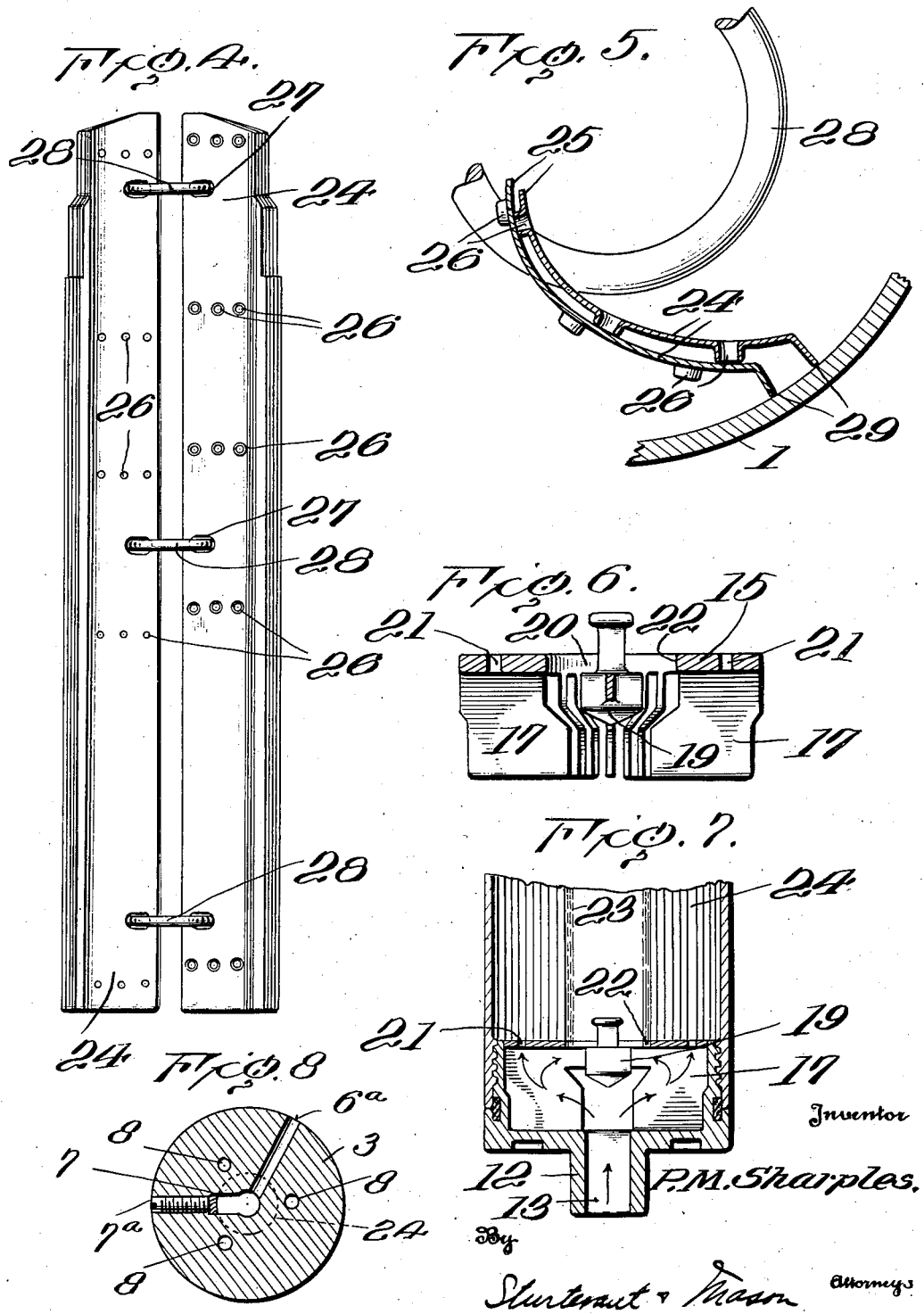

Patented July 5, 1927.

1,634,759

UNITED STATES PATENT OFFICE.

PHILIP M. SHARPLES, OF WEST CHESTER, PENNSYLVANIA, ASSIGNOR TO THE SHARPLES SEPARATOR COMPANY, OF WEST CHESTER, PENNSYLVANIA, A CORPORATION OF PENNSYLVANIA.

CENTRIFUGAL MILK SEPARATOR.

Application filed July 30, 1924. Serial No. 729,136.

This invention relates to centrifugal separators.

Certain features of the invention are applicable to the generic art of centrifugal milk separation, and other features are particularly concerned with improved constructional details of the type of divided-plate Sharples separator bowl which is well known to those skilled in the art. For the purpose of convenience in illustration and description, the various generic and specific features of the invention will be disclosed by reference to the Sharples bowl, but it will be understood that this type of bowl is selected merely in order to exemplify the invention, and is not to be interpreted as a limitation of the scope thereof.

In order to present this invention most clearly, reference will be made at once to the drawings disclosing the improved Sharples separator bowl as now constructed to embody the specific improved details as well as the more generic features of the invention.

Figure 1 represents a side sectional elevation of the separator bowl showing the divided plates in elevation;

Fig. 2 is a sectional view on the line 2—2 of Fig. 1;

Fig. 3 is a sectional view on the line 3—3 of Fig. 1;

Fig. 4 is a detail perspective view showing the manner of assembling the dividing plates;

Fig. 5 is an enlarged sectional view of two of the divided plates in position within the bowl;

Fig. 6 is a detail sectional view of the detachable partition separating the starting chamber from the dividing plate chamber of the bowl; and Fig. 7 is a cross sectional view of the lower portion of the bowl drawn to exact size of one of the commercial types of the improved Sharples separator.

Fig. 8 is a cross sectional view taken on line 8—8 of Fig. 1.

It will be understood by those acquainted with the art of milk separation, that the Sharples type of bowl indicated in Fig. 1 of the drawings, comprises a relatively long cylindrical shell 1 provided at its upper end with a seat 2 to receive the upper cap 3 which closes the upper end of the bowl. This cap 3 is formed at its upper end with a spindle 4 and is constructed to detachably connect with the depending driving spindle of the centrifugal bowl rotating means, not shown. In the present instance, this connection comprises a hollow tube 5 having projecting ends which form a part of a bayonet attaching joint, the corresponding slots of the bayonet joint being in the depending spindle of the bowl rotating means. The cup is shown as provided with a plurality of conduits. One of these conduits 6 is centrally located of the axis of the bowl 1 and is closed at its upper end by the depending driving spindle, not shown on the drawings. A radial hole 6ª establishes communication between conduit 6 and the atmosphere and serves during operation as a centrifugal air pump to exhaust the air from the conduit 6. In addition, this cap is provided with the usual cream discharging aperture 7 controlled by a cream screw 7ª and skimmed milk discharging apertures 8. Inasmuch as the invention is not concerned with the details of these skimmed milk and cream discharge apertures, no further allusion will be made thereto. The lower portion of the cap 3 is extended in the form of a sleeve 9 which tapers down to a relatively thin annular edge 10.

The lower end of the casing 1 is provided with a flange 11 internally threaded to receive a bottom cap 12 which screws thereinto to close the lower end of the bowl. This bottom cap is provided with a milk inlet 13 through which the milk is fed by suction or jetting as is well known to those skilled in the art. This bottom cap is provided with an inwardly projecting flange 14, somewhat cup-shaped so as to receive the detachable member shown in detail in Fig. 6 of the drawings. This member comprises a plate 15 which forms a partition extending across the bowl and fits snugly within the inner annular walls of the cap 12, thus forming a chamber 16 into which the milk flows from the inlet 13. This chamber is hereinafter referred to as the milk starting chamber. The bottom face of plate 15 has a series of starter blades 17 radiating from the common center thereof as shown clearly in Fig. 3. These blades may be soldered or otherwise affixed to the bottom of this plate. In addition thereto, the plate is provided with a cross piece or bridge 18 extending diametrically through the central axis of the plate and adapted to support a conically arranged milk spreading nose 19. The inner edges of the blades 17 terminate short of this nose and concentrically surround the same in spaced relation therefrom. The plate 15 is provided with a central aperture 20 concentrically surrounding this conical nose 19 which will be hereinafter referred to as the preliminary cream inlet. In addition, the plate 15 is provided with an outer annular slot 21 located near to the outer periphery of the plate. This annular aperture 21 constitutes the milk inlet to the dividing plate zone of the bowl, and its arrangement and disposition will be hereinafter more fully explained.

The most convenient manner of constructing this plate 15, the starting blades 17 and the conical nose 19 is shown clearly in the drawings. For instance, instead of making the plate 15 of a single piece of metal and forming the two concentric apertures therein, the production construction resides in providing two concentrically arranged annuli, one within the other, and spaced apart to provide the outer aperture 21. The inner annuli is formed with a central aperture of a size corresponding to 20. These annuli are then held in such spaced relation by means of the starting blades 17 which are soldered thereto. One of these starting blades, to wit—18, is of slightly different shape than the others. Instead of terminating in spaced relation to the central axis of the annuli, it extends entirely across the central aperture 20 as a sort of bridge, and integrally supports the conical nose 19. When this combined partition, accelerator blade and conical spreading nozzle member is inserted in the bowl, and the cap screwed home, the spreading nose 19 will be positioned axially of the milk inlet 13 and directly opposite the same, so that the milk entering the aperture 13 will be projected against the conical nose of the spreader 19 and will be spread out radially between the starting blades 17, and since these blades are thus rigidly mounted with the rotating bowl, the necessary immediate rotating motion will be imparted to the entering milk.

That portion of the bowl between the partition plate 15 and the upper end of the bowl is provided with a series of dividing plates 24, which, as is common practice, are constructed and arranged to divide the incoming milk into a plurality of thin layers disposed across the radial lines of the bowl. These plates are detachably mounted therein so as to be removable for cleaning purposes.

The general arrangement of these improved dividing plates or liners 24 when they are disposed in separating position in the bowl, is shown in Figures 1, 2, 4 and 5 of the drawings. They are slightly curvilinear in form as shown clearly in Fig. 5, and are of sufficient width and are designed to extend from a point 25 spaced from the central axis of the bowl outwardly to the inner wall of the bowl. Each of these liners or plates is of sufficient length to extend from substantially the upper portion of the stepped wall of the bowl downwardly to the base of the partition 15. The relative width and length of a liner or plate is shown clearly in Fig. 4. As before stated, each of these plates is similar in construction and are so designed that a plurality of them when placed in position in the bowl, nest therein as shown in Fig. 2 to form a series of milk channels therebetween. The inner ends of each of these plates form, in effect, an annular hollow space concentrically surrounding the axis of the bowl as shown in Fig. 2. While various arrangements of these liners may be used in this bowl, the arrangement of liners specifically illustrated in Figures 2, 4 and 5 is preferred. As shown in the drawings, these liners comprise a series of plates 24 extending preferably the full length of the bowl, although not necessarily so. These plates are all similar in construction and are similarly curved and are arranged somewhat spirally within the bowl, the outer ends of the liners resting firmly against the inner wall of the bowl, and the inner ends of the liners terminating in a line spaced from and concentric to the central bowl axis, so as to provide the central passage longitudinally through the central axis of rotation of the plates. It has been ascertained that when these plates are set at a certain inclination to the radius of the bowl, the cream will drift toward the center of the bowl along the outer surface of a curved plate without displaying any marked tendency to collect or stick to the surface thereof. The preferred inclination is about thirty degrees, although this may be varied more or less to a certain extent. For instance, by making the plates more nearly radial, the cream will more readily slide or flow toward the center, while by making them more nearly at right angles to the radius, will give greater width of plate and consequently fewer plates. Obviously, when the plates are arranged most nearly at right angles to the radius, they are most efficient, because the distance on the radius is shorter, and hence more of these separating plates will cross any given radius. On the other hand, if the plates are arranged at a considerable angle to the radius, the distance on the radial line between successive plates is greater in length, and therefore, less plates cross a given radius, and the separating efficiency will be lowered, although the cream will flow more easily. From this, it will be readily seen that there is just the right angle at which the cream will flow, and which, at the same time, will secure the greatest separating efficiency. Up to the present time, these blades or vanes of the separator have been constructed so as to present different angles to the radius at different points, so that while a particular plate may have been efficient at one point, it was too flat at another point or too inclined. In the present type of blade, this objection is overcome by shaping the plates so that each plate will be arranged at a most efficient angle for proper flow and separation of the cream at all points throughout. In other words, these plates are curved so that each one at every point where it crosses the radius will cross the radius at the same angle, and as before stated, the preferred angle is about thirty degrees.

No claim is made in this present application to the foregoing feature relating to the curvature of these liners, and to broadly a means for maintaining these liners in spaced relation in the bowl, inasmuch as the same forms the subject-matter of a co-pending application, filed by David T. Sharples, May 19, 1924, Serial No. 714,356 and assigned to the Sharples Separator Company. However, certain features of improved construction respecting the disposition, construction and assemblage of these liners will now be disclosed, and will be hereinafter claimed.

In the prior construction set forth in the above-identified co-pending application, the blades were made of steel and tinned to prevent rusting. Small spacers were either soldered or otherwise fastened on them in order to maintain each blade in spaced relation with respect to the next adjacent blade, so that the interstices between the blades formed individual milk channels through which the milk was forced in thin layers under the high speed rotation of the bowl. It will be understood that with the excessive speeds of centrifugal separators, the strain on these blades is considerable, and therefore, it was not only necessary to make them of very durable metal, but to provide an efficient means for maintaining their spaced relation. When these blades were made out of steel, this strain, due to the centrifugal force, was excessive and great difficulty was experienced in maintaining the proper spacing of the blades.

This trouble has been overcome in the present invention by forming these blades of duralumin, which makes a very light, and at the same time, a very strong blade, the advantages of which are that the blade is nearly as strong as steel, is much lighter, and does not have to be tinned to prevent rusting. A very novel means for spacing these blades is disclosed in Figures 4 and 5 of the drawings, wherein each individual blade is shown as provided with a series of punched holes 26, the metal being punched up into a ferrule. By making these little ferrules just the correct length, the distance between each succeeding blade is regulated thereby assuring that the blades are spaced one from the other the correct distance apart throughout their length and width. This provides a very firm and efficient means for maintaining the position of the blades in the bowl. These ferrules are preferably made by punching the hole clean through the blade which is very important, because it makes the blade more easily cleanable and there is no place for the dirt or stale milk to collect, as there would be if the ferrule were in the form of a small depression. In addition to this novel arrangement of spacing ferrules, an improved means is provided for maintaining the ferrules together, both in and when taken out of the separator bowl. In this construction, the blades are provided with a series of registering holes 27 near their inner edges, and rings 28 are passed through these holes to maintain them together, somewhat after the manner of a loose-leaf book. This permits the blades to fold up so as to go into the bowl in a spiral arrangement such as shown in Fig. 2, or, when taken out of the bowl, they will open up just like the pages of a book open out as in Fig. 4, which permits them to be readily cleaned. In this open position, they are held by the rings 28 in assembled position with respect to each other.

Still another improved feature of these plates resides in the construction of the outer end of each blade 24 which is that end resting against the inner wall of the bowl. In the construction set forth in the co-pending application of David T. Sharples, hereinbefore mentioned, the curvature of the blade was unaltered at the outer end, whereas, in the present application, the tip 29 of the outer end of this blade is bent into a plane radial to the axis of the bowl, thereby providing around the circumference of the divided plate liner, a series of radially arranged pockets lengthwise of the bowl and circumferentially therearound. These pockets are adapted to form conduits lengthwise of the bowl to permit the skimmed milk to pass to the top and hence to the outlet 8 of the bowl. At the same time, these pockets are adapted to receive and retain the sediment and other dirt in the milk which is thrown outwardly under the centrifugal force. Furthermore, by forming the outer ends of the blades radial as illustrated, a more efficient and firmer seating of the outer end of the blade against the wall of the bowl is provided.

In the former construction set forth in a co-pending application of David T. Sharples, the milk inlet at the lower end of the bowl was arranged in the plane of the center axis of the bowl to discharge the incoming milk directly into the divided plate portion of the bowl at a point substantially near the central axis of the bowl or more exactly at a point or zone lying between the milk zone and the cream zone, usually described as "just behind the cream wall or cream zone." This milk was then forced outwardly between the spacings in these plates. The milk thus forced outwardly traveled along the curved face of the blade toward the outer wall of the bowl, and as it traveled outwardly under the influence of the centrifugal force, the separation took place, the heavier skimmed milk being carried uninterruptedly along to the outer wall of the bowl and the lighter cream globules thus separated from the blue milk, reversing their former direction of flow and now moving in a reverse direction toward the central axis of the bowl where they formed an inner cream wall traveling upwardly and out through the cream discharge located nearer the central axis of the bowl than the skimmed milk discharge as is well known in the art. Observation showed that the layer of milk flowing in the space between two adjacent blades thus formed itself into two reversely moving streams of fluid. The heavier blue skimmed milk portion of the new milk under the action of the centrifugal force was thrown against the inner wall of a blade and hence moved outwardly toward the wall of the bowl, while on the other hand, the cream globules in that layer of milk, being lighter, were displaced toward the outer wall of the next adjacent or succeeding blade, and under this same centrifugal action, flowed inwardly toward the central axis of the bowl. These two reversely moving streams were in frictional contact, and since the cream present in the new milk is only about one-fifth thereof, and since the new milk was introduced at a point substantially near the central axis of the bowl, or in other words, since this new milk was introduced into the skimming division between the plates at a point or zone, which, under the old practice, lay between the outer milk zone and the inner cream zone, consequently a far larger bulk of milk moved outwardly under the centrifugal force than cream moved inwardly, and since these milk and cream currents traveled in opposite directions very close together, the cream globules due to their frictional contact with the outward flow of the blue milk, were carried outwardly with the skimmed milk until the gradual increasing centrifugal forces acting upon it, caused the cream to reverse its travel as before described. This old location of milk inlet was found to produce delayed separation of the milk and cream, and also brought about an incomplete separation of a portion of the cream globules. This latter was due to the fact that the small percentage of them which were minute and light were dragged outwardly by frictional contact with the outflowing skimmed milk and are carried bodily to the skimmed milk discharge. They have not enough ponderosity to be separated by the separating centrifugal force.

Another feature of the present invention relates to the method of introducing the new milk into the separator bowl in such a manner and at such a point with respect to the dividing separator plates as will, to the greatest extent possible, minimize the harmful effect of this outer current of skimmed milk. In other words, under the old practice, the main current of milk after entering the bowl flowed outwardly, because approximately four-fifths of the liquid must go to the largest diameter of the bowl in order to escape as skimmed milk, while the other one-fifth gravitated to the center and was discharged as cream, whereas, in accordance with this new method for effecting more rapid and efficient skimming, the new milk is introduced to the divided plates close to the outside or largest diameter of the divided plate or separating portion of the bowl, so that the course of the cream will be at once inward, and the main separating flow between the milk and cream will be inwardly rather than outward. In explanation of this, it might be stated that even when the new milk is introduced close to the outside of the divided plate zone of the bowl, the cream and milk will not separate instantly, (although it will be much nearer instantly because of the larger diameter and hence more intense centrifugal force) so that a little of the skimmed milk will be carried toward the center and will have to reverse itself and go again to the large diameter in order to escape at the skimmed milk outlet. But the main current, that is, the main separating current is inward, and there is no strong outwardly bound separating current tending to drag the cream with it to the outside of the bowl.

Referring now to the new location of the milk inlet and in particular to Fig. 7 of the drawings, the arrow shows the line of movement of the new milk as it enters the bottom inlet 13. As before stated, when the milk enters a rapidly rotating bowl, the starting blades 17 immediately give the milk the revolutions of the bowl and it flows outwardly into the starting chamber 16, the milk being spread by a conical nose 19. It will be appreciated that much of the cream or fat separates instantly, and in order to permit this instantly separated fat to pass directly to the cream discharge without being compelled to pass through the divided plates of the bowl, the central aperture 20 as hereinbefore described is located in the partition 15 as shown so that the cream can pass into the cream zone as at 23, which cream zone leads to the top of the bowl and out. To this end, the inner edge 22 of the opening 20 is located at a point farther out on the radius than the inner edge of the cream wall 23. This allows the cream to pass around and up through the opening 20 as hereinbefore described. The new milk which contains the cream globules which do not separate out preliminarly as just described, is caused to enter the dividing plate zone of the bowl through the milk opening 21, which is the circular aperture hereinbefore described in connection with the detachable partition member shown in Fig. 6, and the milk which passes through this opening flows into the spaces between the separator blades where it is acted upon by centrifugal force. By reference to Fig. 2, it will be seen that the curvilinear portion of the divided plates extend considerably outside of the annular milk inlet 21, and that outside of that line, the plates become more radial and are less inclined to divide the milk into thin layers across the radial lines of the bowl. To define the precise spot where this milk inlet 21 is most advantageously located with respect to the curvilinear plates, is rather difficult. It cannot be located at the usual place between what is called the cream zone and the milk zone, nor can it be located in the skimmed milk zone. It must be located between these two positions and as near to the blue milk zone as may be without spilling into it too readily, and at such a location as to escape to the greatest possible degree the influence of the strong outlet current of milk that will carry with it the cream globules. When it is appreciated that a cream separator leaving as much as .05 percent of fat in the skimmed milk is inferior and that the agricultural stations will condemn the machine, while a skimming of .02 percent or below is very good skimming, it will be understood that if the location of this hole in one instance, will result in the inferior skimming, while another predetermined location of this hole will result in efficient skimming, the matter of location of this milk inlet is one of extreme importance in the art of centrifugal milk separation.

Referring now particularly to the drawings, Fig. 7 is a sketch of a commercial Sharples bowl drawn to scale and to exact dimensions as used in practice. The diameter of the inside of the milk inlet aperture 21, is, in this sketch, 1-27/64", while the diameter of the outside of this milk inlet aperture is 1-35/64". Now, experiments have shown that if this milk inlet aperture 21 is placed so that its inside diameter is one inch and the outside diameter one and one-eighth inches, then it will deliver the incoming milk into the zone between the so-called milk and cream zone, which location is the usual place heretofore employed for introducing the milk into divided layer bowls.

The following are the actual tests of skimming when placing this inlet 21 in accordance with the following data, wherein A represents the inside diameter of the aperture 21, and B represents the outside diameter of the aperture 21.

| Inches. | | Per cent. |
|---|---|---|
| A—1 | Sk. M. | .06-1/2 |
| B—1-1/8 | Cream | 35 |
| A—1-1/8 | Sk. M. | .04 |
| B—1-1/4 | Cream | 35 |
| A—1-3/16 | Sk. M. | .03-3/4 |
| B—1-5/16 | Cream | 35 |
| A—1-17/64 | Sk. M. | .03 |
| B—1-25/64 | Cream | 35 |
| A—1-21/64 | Sk. M. | .02-1/4 |
| B—1-29/64 | Cream | 35 |
| A—1-25/64 | Sk. M. | .02 |
| B—1-33/64 | Cream | 35 |
| A—1-27/64 | Sk. M. | .01-1/2 |
| B—1-35/64 | Cream | 35 |
| A—1-9/16 | Sk. M. | .05 |
| B—1-11/16 | Cream | 35 |

From this, it is evident that the skimming gets better and better up to the diameter 1-27/64" for the inside diameter and 1-35/64" for the outside diameter of the inlet 21, which corresponds to the location of inlet 21 in Fig. 7. It is also manifest how badly the skimming drops back as soon as the aperture 21 is located near the skimmed milk conduit portion of the bowl which of course, is nearer to the inner wall of the separator bowl, or what is known as the blue milk zone.

Still another feature of this invention relates to the improved means for feeding the milk into the bowl. In the former construction of Sharples bowls, the bottom milk inlet 13 was made of rather ample size, and the air exhausting hole at the top which corresponded in a general way to the air conduit 6 of Fig. 1 of the present drawings, was made of the requisite diameter to draw up the proper amount of milk by suction. In this former arrangement, great trouble was experienced in securing a regular flow of milk into the bowl, for the reason that a very small obstruction in this air exhaust aperture made a large variation in the suction feeding. For instance, if an air bubble passed into the lower hole corresponding to 13 with the milk, or if the milk was a little frothy, they would tend to choke the air exhaust conduit 6 and produce wide variations in the feed. In the present construction, the bottom hole 13; that is, the inlet hole of the nozzle is reduced in size so as to choke the amount of incoming milk, and the air exhaust hole 6 is made of ample, or rather excess size. This radical alteration in the relative sizes of the milk inlet and air exhaust outlet may be a very important difference in the working of the separator, and provide a regular and uniform flow. In other words, by making the air exhaust hole larger, and the inlet aperture 13 smaller relatively, there is provided an excess amount of exhaustion or suction, and the inlet is choked so as to cut down the inflow of milk to the proper amount.

In the operation of my improved separator bowl, it will be understood that when the bowl is rotated at separating speed, the milk is drawn in through the milk inlet 13 by means of the suction and the exhaustion of the air through the air conduit 6. This body of fresh milk passing into the nozzle 13 contacts with the spreader nose 19 and the milk is then distributed into the starting blades 17 in the separating chamber 16. These blades produce the initial starting of the milk. As before stated, a certain portion of the cream globules in the milk will separate out almost instantly and will pass to the initial cream inlet 20 as heretofore described, and thence up the cream wall to the cream outlet 7. The residue of the milk will be compelled to pass through the annular inlet aperture 21 into the divisions between the plates 26. The richer portion of this milk flowing in these thin layers between the blades, under the action of the centrifugal force, will at once turn toward the central axis of the bowl, that is, toward the cream wall, and the poorer milk will flow outwardly toward the bowl wall. In thus flowing outwardly, additional globules of the milk will be acted upon by the separating force and will also move inwardly toward the central axis of the bowl. In addition to this, since the milk travels upwardly throughout the length of the vertical extent of these blades, practically all of the lighter cream globules will be afforded ample time to separate out and travel inwardly, while the blue milk or skimmed milk will travel upwardly and outwardly into the radial pockets formed by the radial tips 29 of the blades, and in this manner, the skimmed milk will shoot upwardly in these vertical pockets to the milk discharge outlet 8. The sediment and dirt in the milk will be retained and confined in these radial pockets.

Experience has shown that if the new milk is introduced into the divided plate zone at a point corresponding to the outer conduits formed by the radial tips 29, or what is known as the blue milk zone, a large portion of the new milk instead of passing on into the separating part of the zone, to be separated as heretofore described, will shoot directly upwardly and discharge outwardly through the skimmed milk outlet and escape with much of the cream still in it.

It is obvious that minor changes in the details of construction and the arrangement of the parts may be made without departing from the spirit of the invention as set forth in the appended claims.

Having thus described the invention, what I claim as new and desire to secure by Letters-Patent, is—

1. A centrifugal cream separator including a rotated bowl having a skimmed milk outlet and a cream outlet, a liner for said bowl comprising a plurality of relatively thin plates forming milk separating channels therebetween, and means for delivering the whole milk to the bowl in a restricted area toward the axis of rotation from and adjacent the skimmed milk zone, whereby the cream content separated from the whole milk may flow in a continuous direction approaching the central axis of the bowl, and whereby the skimmed milk may be separated from the whole milk.

2. A centrifugal cream separator including a rotated bowl having a skimmed milk outlet and a cream outlet, a liner for said bowl comprising a plurality of relatively thin plates forming milk separating channels therebetween, and means for delivering the whole milk into said channels in a restricted area toward the axis of rotation from, but near the edges of said plates so as to create a skimmed milk zone substantially free from whole milk and cream, and so that the cream separated from the whole milk may flow in a continuous direction approaching the central axis of the bowl.

3. A centrifugal cream separator including a rotated bowl having a skimmed milk outlet and a cream outlet, a liner for said bowl comprising a plurality of relatively thin plates forming milk separating channels therebetween, and means for delivering the whole milk to the bowl in a restricted area spaced inwardly from the outer periphery of the plates a sufficient distance to cause the milk to pass into the spaces between the plates and the cream content thereof to be separated and flow during such separation directly toward the central axis of the bowl.

4. A centrifugal cream separator including a rotated bowl having a skimmed milk outlet and a cream outlet at the upper end thereof, a liner for said bowl comprising a plurality of relatively thin plates forming milk separating channels therebetween, and means for delivering whole milk to the bowl at the lower end of the liner and in a restricted area toward the axis of rotation from and adjacent the skimmed milk zone, whereby the cream content separating from the whole milk can flow in a continuous direction approaching the central axis of the bowl and whereby the skimmed milk may be separated from the whole milk.

5. A centrifugal separator bowl having the usual cream and skim-milk outlets, a series of dividing plates in said bowl located about its central axis, a partition member located in said bowl at one end of said plates and provided with an annular milk inlet therethrough, spaced inwardly from the outer periphery of the plates a sufficient distance to cause the milk to pass into the spaces between the plates and the cream content thereof to be separated and flow during such separation directly toward the central axis of the bowl.

6. A centrifugal bowl for separating cream from milk having the usual cream and skim-milk outlets at one end and a new milk inlet at the other, a plurality of dividing plates arranged in said bowl intermediate its ends to form milk separating channels disposed longitudinally of said bowl and across the radii thereof, and means in said bowl between said new milk inlet and said dividing plates for causing the milk to enter the spaces between the plates at points located substantially just inside the skim-milk zone a predetermined distance whereby to cause the cream to flow inwardly toward the central axis of the bowl and the blue milk to flow toward the skim-milk outlet.

7. A centrifugal separator bowl for separating cream from milk comprising a relatively long rotatable cylinder having cream and skim-milk outlets at one end, and a milk inlet at the opposite end, a plurality of dividing plates arranged in the cylinder between its ends, a partition plate disposed at the end of said dividing plates and between said plates and the milk inlet, a milk spreading nose mounted directly opposite the milk inlet whereby to spread said milk outwardly as it enters said milk inlet, a plurality of rotatable starter blades adapted to impart rotary movement to the milk thus spread by the spreader, said partition having a preliminary cream discharging aperture arranged about the central axis of the bowl to permit the passage of the cream which is preliminarily separated to pass therethrough, said partition having an annular milk inlet disposed therein between said central cream aperture and the outer periphery of said partition, whereby to cause the passage of the milk through said partition into the dividing plates.

8. In a device of the class described, the combination of a centrifugal bowl for separating cream from milk, provided with skim-milk and cream discharge outlets and a new milk inlet, a plurality of dividing plates arranged in said bowl between the inlet and the outlets and arranged to form a central aperture longitudinally of said plates for the passage of the separated cream, means arranged adjacent the milk inlet for preliminarily centrifuging the milk, means for feeding the milk thus centrifuged into the spaces between the dividing plates to cause the separation of the cream and skim-milk contents of said milk, and means for passing the cream separated by the preliminary centrifuging directly into the central cream passage.

9. A device of the class described comprising a centrifugal separator bowl having cream and skim-milk discharge outlets at one end and a milk inlet at the other end, a plurality of dividing plates arranged in spiral form in said bowl and forming a central hollow passage extending longitudinally of the bowl, a partition plate in said bowl at one end of said dividing plates and between said plates and the milk inlet, said partition comprising two annuli spaced apart to form an annular opening located near the periphery of the partition, said inner annulus having a central perforation therethrough registering with the hollow passage of the dividing plates, a plurality of blades arranged radially on said annuli and rigidly connecting and spacing the same, said blades extending in a direction of the milk inlet to impart a preliminary centrifuging to the milk, said blades having a conical nosed deflector arranged thereon and located directly opposite the milk inlet so as to deflect the milk entering therethrough, said conical nosed deflector being arranged below the central aperture of the inner annulus and of a smaller diameter than said aperture whereby to permit cream separated from the milk by the preliminary centrifuging movement to pass directly into the central cream passageway of the plates.

10. A liner for a centrifugal separator bowl comprising a plurality of relatively thin curved plates forming milk separating channels therebetween lying across the radius of the bowl when the plates are assembled, said plates being formed of duralumin, whereby the plates are relatively light, non-rusting, and at the same time sufficiently strong to maintain a permanent shape under the stress of centrifugal force at high speed, and means for holding said plates spaced from each other.

11. A liner for a centrifugal separator bowl comprising a plurality of relatively thin curved plates forming milk separating channels therebetween, lying across the radius of the bowl when the plates are assembled, said plates being punched therethrough at spaced intervals to provide a plurality of struck-up lugs thereon for spacing the plates, said plates being formed of duralumin whereby the plates are relatively light, non-rusting, and at the same time sufficiently strong to maintain a permanent shape under the stress of centrifugal force at high speed.

12. A liner for a centrifugal separator bowl comprising a plurality of independent dividing plates of suitable curvature to permit said plates to nest spirally within said separator bowl when assembled therein, said plates having means for maintaining them in spaced relation when assembled in said bowl, and means for holding said plates in assembled relation when withdrawn from said bowl.

In testimony whereof, I affix my signature.

PHILIP M. SHARPLES.